(12) United States Patent
Lauder

(10) Patent No.: US 8,833,158 B2
(45) Date of Patent: Sep. 16, 2014

(54) SEALING SYSTEM AND LEVEL MONITOR FOR A TANK

(76) Inventor: Arthur W. Lauder, Edmonton (CA)

( * ) Notice: Subject to any disclaimer, the term of this patent is extended or adjusted under 35 U.S.C. 154(b) by 566 days.

(21) Appl. No.: 13/049,715

(22) Filed: Mar. 16, 2011

(65) Prior Publication Data

US 2012/0234092 A1 Sep. 20, 2012

(51) Int. Cl.
*G01F 23/00* (2006.01)
*G01F 23/42* (2006.01)

(52) U.S. Cl.
CPC .................................... *G01F 23/42* (2013.01)
USPC ........................................................... 73/313

(58) Field of Classification Search
USPC ........................................................... 73/313
See application file for complete search history.

(56) References Cited

U.S. PATENT DOCUMENTS

| | | | |
|---|---|---|---|
| 1,937,447 A * | 11/1933 | Tokheim | 73/321 |
| 2,204,253 A | 6/1940 | Maccreedy | |
| 2,237,462 A | 4/1941 | Tokheim | |
| 2,286,425 A | 6/1942 | La | |
| 2,580,057 A | 12/1951 | Wilhelm et al. | |
| 2,634,608 A | 4/1953 | Sorber | |
| 2,802,362 A | 8/1957 | Lyon | |
| 3,057,199 A | 10/1962 | Koehne | |
| 3,279,254 A | 10/1966 | Zumbusch | |
| 3,482,447 A | 12/1969 | Bennett | |
| 3,955,358 A | 5/1976 | Martz et al. | |
| 4,083,661 A | 4/1978 | McPherson et al. | |
| 4,244,219 A | 1/1981 | Takahashi | |
| 4,580,450 A | 4/1986 | Ota et al. | |
| 4,761,120 A | 8/1988 | Mayer et al. | |
| 5,144,836 A | 9/1992 | Webb | |
| 5,649,450 A | 7/1997 | Glab et al. | |
| 6,460,622 B1 | 10/2002 | Rice | |
| 6,523,404 B1 | 2/2003 | Murphy et al. | |
| 7,313,956 B1 * | 1/2008 | Murphy, Sr. | 73/313 |
| 7,344,396 B2 | 3/2008 | Stagi et al. | |

OTHER PUBLICATIONS

Bukhari et al,. Multi-interface Level Sensors and New Development in Monitoring and Control of Oil Separators, Sensors 2006, 6, 380-389, published Apr. 7, 2006.

* cited by examiner

*Primary Examiner* — Peter Macchiarolo
*Assistant Examiner* — Alex Devito
(74) *Attorney, Agent, or Firm* — Buchanan Nipper

(57) ABSTRACT

Sealing systems and level monitors for a tank are disclosed. A housing defines a bore and has exterior dimensions suitable for fitting in a port through the tank. An elongate member or cable passes through the bore of the housing. First and second seal assemblies are set within the bore against first and second stops, respectively, in the housing. The first and second seal assemblies are spaced from one another to form a fluid reservoir and are both sealed to the housing and to the elongate member or cable. The fluid reservoir may be pressured by a bias device. The elongate member or cable may be connected to a float.

20 Claims, 5 Drawing Sheets

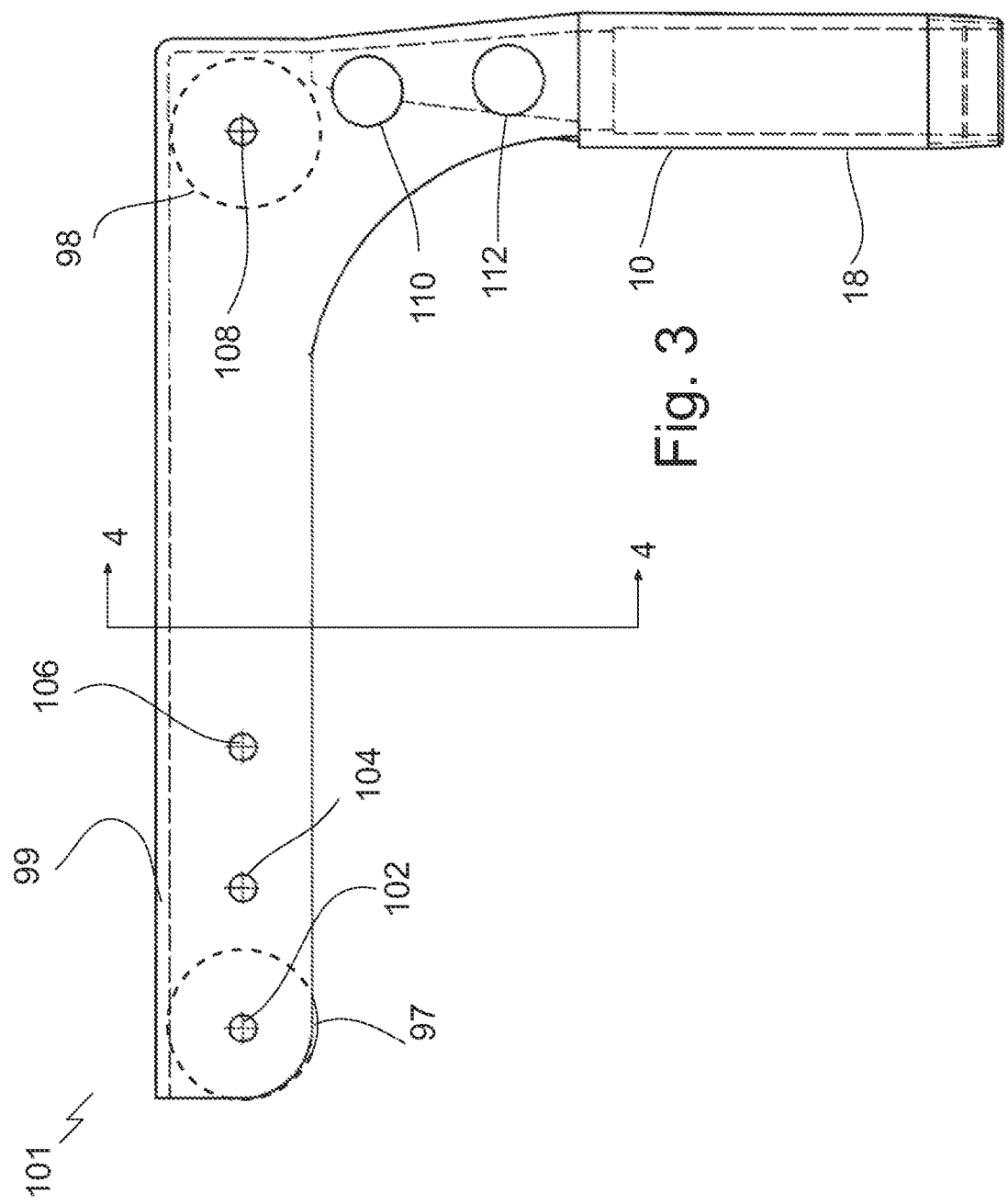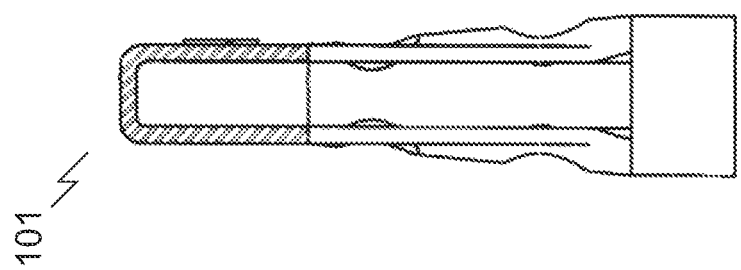

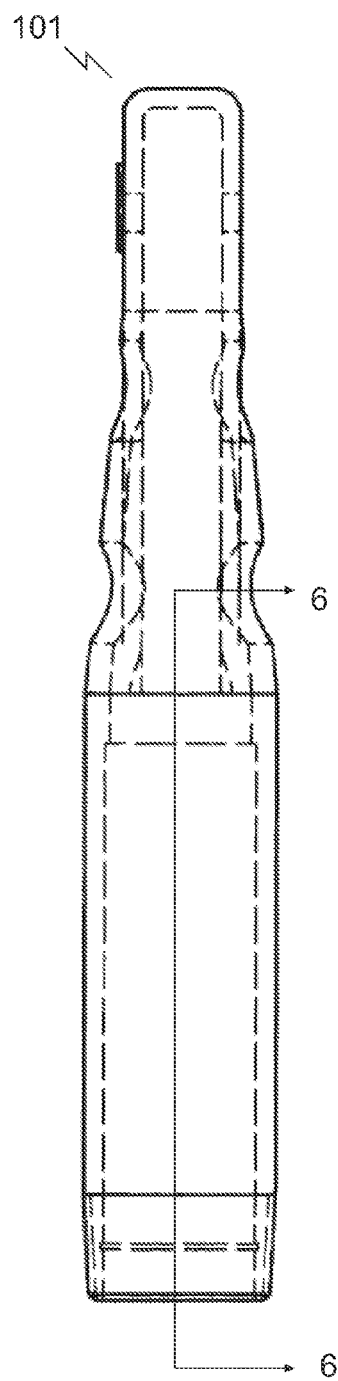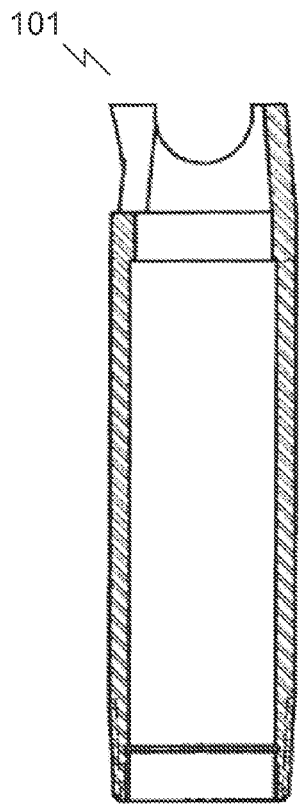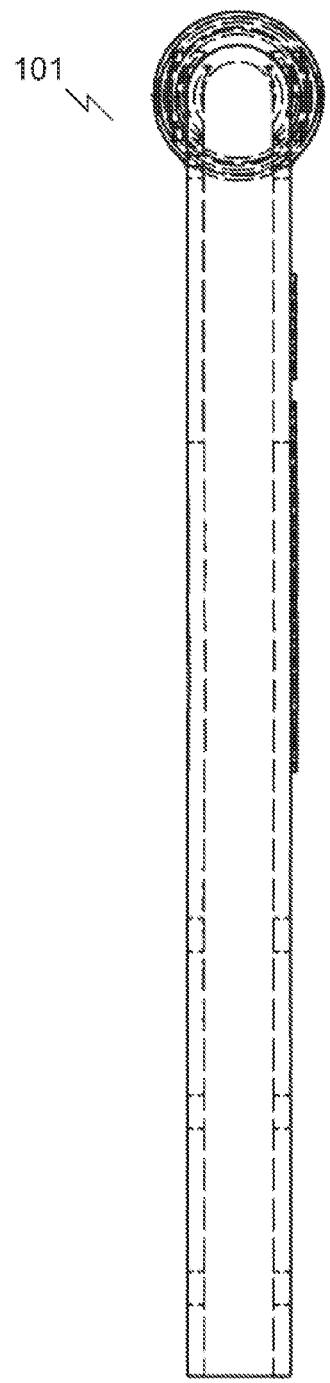
Fig. 5
Fig. 6
Fig. 7

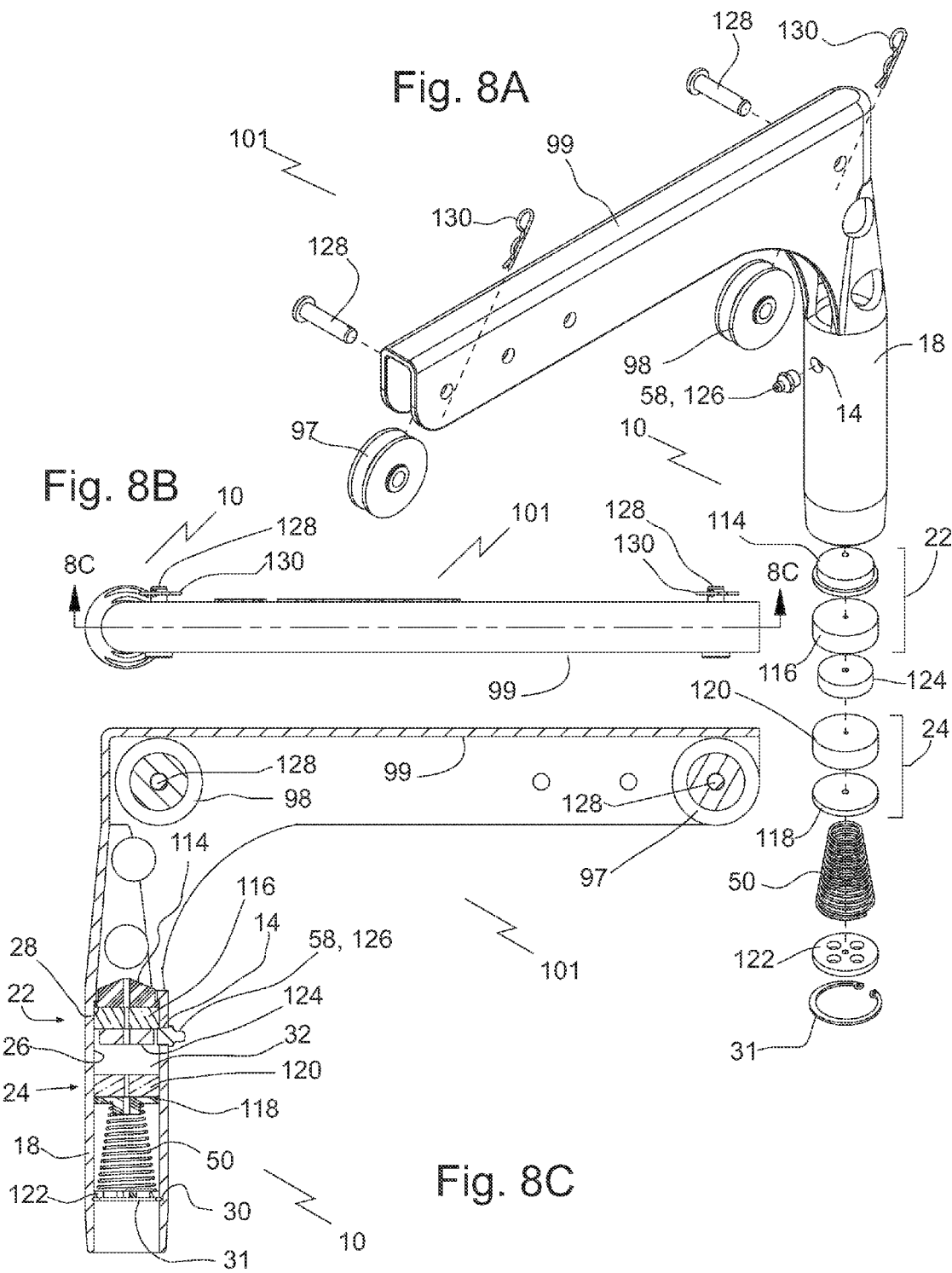

US 8,833,158 B2

SEALING SYSTEM AND LEVEL MONITOR FOR A TANK

TECHNICAL FIELD

This document relates to sealing systems for a tank, and level monitors for a tank.

BACKGROUND

U.S. Pat. Nos. 2,802,362 and 2,204,253 disclose tank fluid level gauge systems that incorporate a seal between a float and a level gauge, thus reducing or preventing fuel vapor loss while allowing monitoring of the liquid level in the tank.

SUMMARY

A sealing system is disclosed for a tank having a port through the tank, the sealing system comprising: a housing defining a bore, the housing having exterior dimensions suitable for fitting of the housing in the port through the tank; a cable passing through the bore of the housing; a first seal assembly set within the bore against a first stop in the housing, the first seal assembly being sealed to the housing and to the cable with the cable passing through the first seal assembly; a second seal assembly set within the bore against a second stop in the housing, the second sealing assembly being sealed to the housing and to the cable with the cable passing through the second seal assembly; and the first seal assembly being spaced from the second seal assembly to form a reservoir containing a fluid and one or both of the first seal assembly and the second seal assembly being biased against the fluid to maintain pressure on the fluid.

A level monitor is disclosed for a tank containing liquid and having a port through the tank, the level monitor comprising: a float for the liquid in the tank; a housing defining a bore, the housing having exterior dimensions suitable for fitting of the housing in the port through the tank; an elongate member attached to the float and passing through the bore of the housing; a first seal assembly set within the bore against a first stop in the housing, the first seal assembly being sealed to the housing and to the elongate member with the elongate member passing through the first seal assembly; a second seal assembly set within the bore against a second stop in the housing, the second sealing assembly being sealed to the housing and to the elongate member with the elongate member passing through the second seal assembly; and the first seal assembly being spaced from the second seal assembly to form a reservoir containing a fluid under pressure.

A sealing system is disclosed for a tank having a port through the tank, the sealing system comprising: a housing defining a bore, the housing having exterior dimensions suitable for fitting of the housing in the port through the tank; an elongate member passing through the bore of the housing; a first seal assembly set within the bore against a first stop in the housing, the first seal assembly being sealed to the housing and to the elongate member with the elongate member passing through the first seal assembly; a second seal assembly set within the bore against a second stop in the housing, the second sealing assembly being sealed to the housing and to the elongate member with the elongate member passing through the second seal assembly; the first seal assembly being spaced from the second seal assembly to form a reservoir containing a fluid; and a bias device for maintaining pressure on the fluid.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 3 is a side elevation view of a gauge head from FIG. 1 comprised of a covered pulley frame and the sealing system of FIG. 2, and with ghost lines used to indicate internal dimensions.

FIG. 4 is a section view taken along the 4-4 section lines of FIG. 3.

FIG. 5 is a rear end elevation view of the gauge head of FIG. 3, with ghost lines used to indicate internal dimensions.

FIG. 6 is a section view taken along the 6-6 section lines of FIG. 5.

FIG. 7 is a top plan view of the gauge head of FIG. 3, with ghost lines used to indicate internal dimensions.

FIG. 8A is a perspective exploded view of another embodiment of a sealing system and gauge head.

FIG. 8B is a top plan view of the embodiment of FIG. 8A.

FIG. 8C is a section view taken along the section lines 8C from FIG. 8B.

DETAILED DESCRIPTION

Immaterial modifications may be made to the embodiments described here without departing from what is covered by the claims.

It may be necessary to monitor liquid product level in tanks such as storage tanks, reservoirs, vessels, and pipelines. Such tanks may comprise contained systems containing one or more types of liquid being stored or transported. In particular, monitoring product level in tanks that contain petroleum products or other volatile liquids may present special requirements. For example, petroleum products such as oil and gasoline may contain viscous components that tend to coat any surface which is exposed to them. This may preclude the use of visual sight gauges for fluid level monitoring. In some cases the volatile nature of such fluids may make level monitoring with electronic level sensing equipment more dangerous. Moreover, it may be difficult or dangerous to install monitoring devices on tanks that are already in operation, due to the possible release of volatile and toxic vapors from the tank while the tank is open to atmosphere. In general, regardless of the nature of the fluids stored in the tank it may be desired to allow monitoring while preventing the escape of fluids to the environment.

Figure 1:
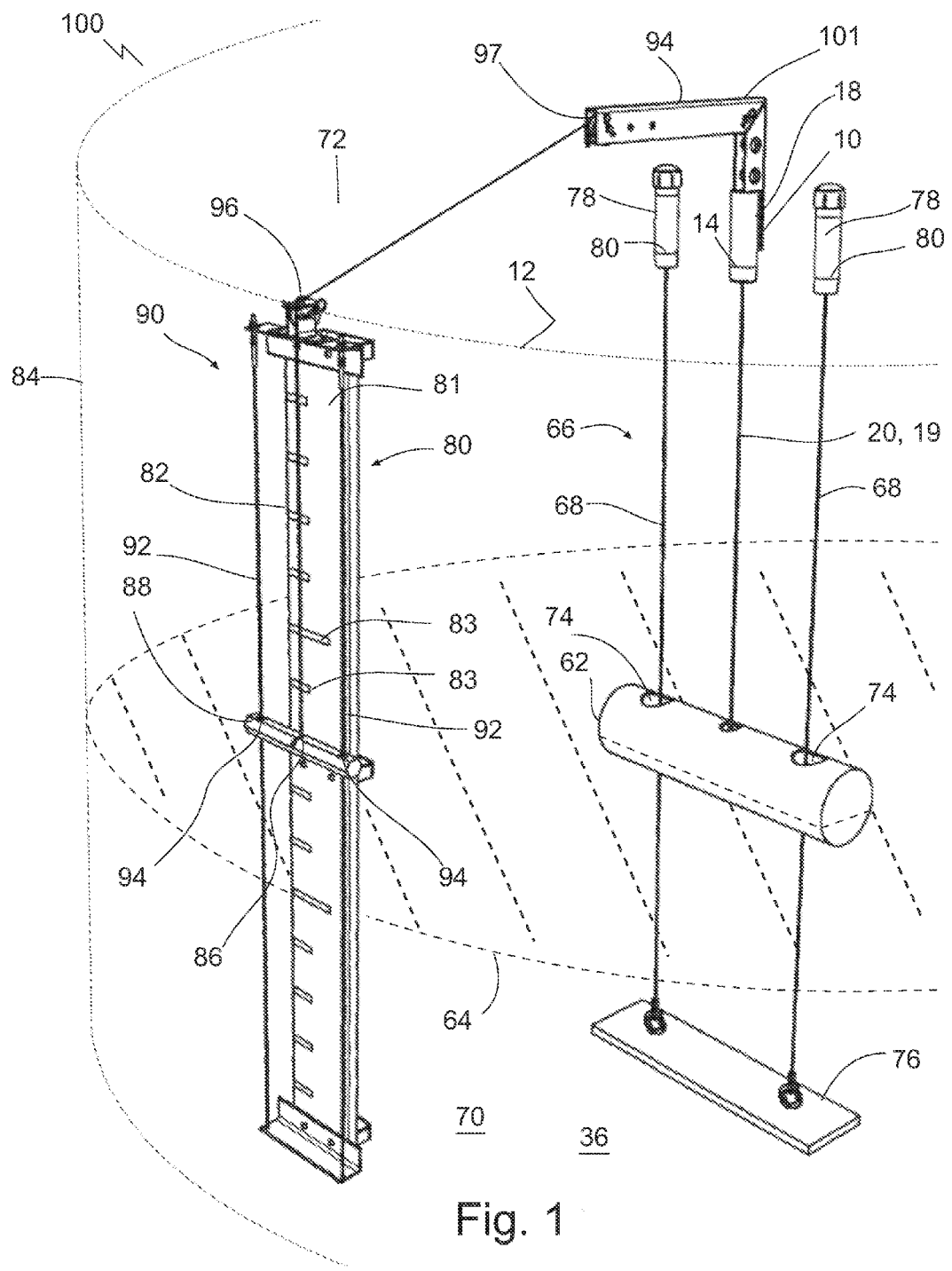
FIG. 1 is a perspective view of a level monitor for a tank, with the tank and liquid contained within the tank illustrated in ghost lines.
Figure 2:
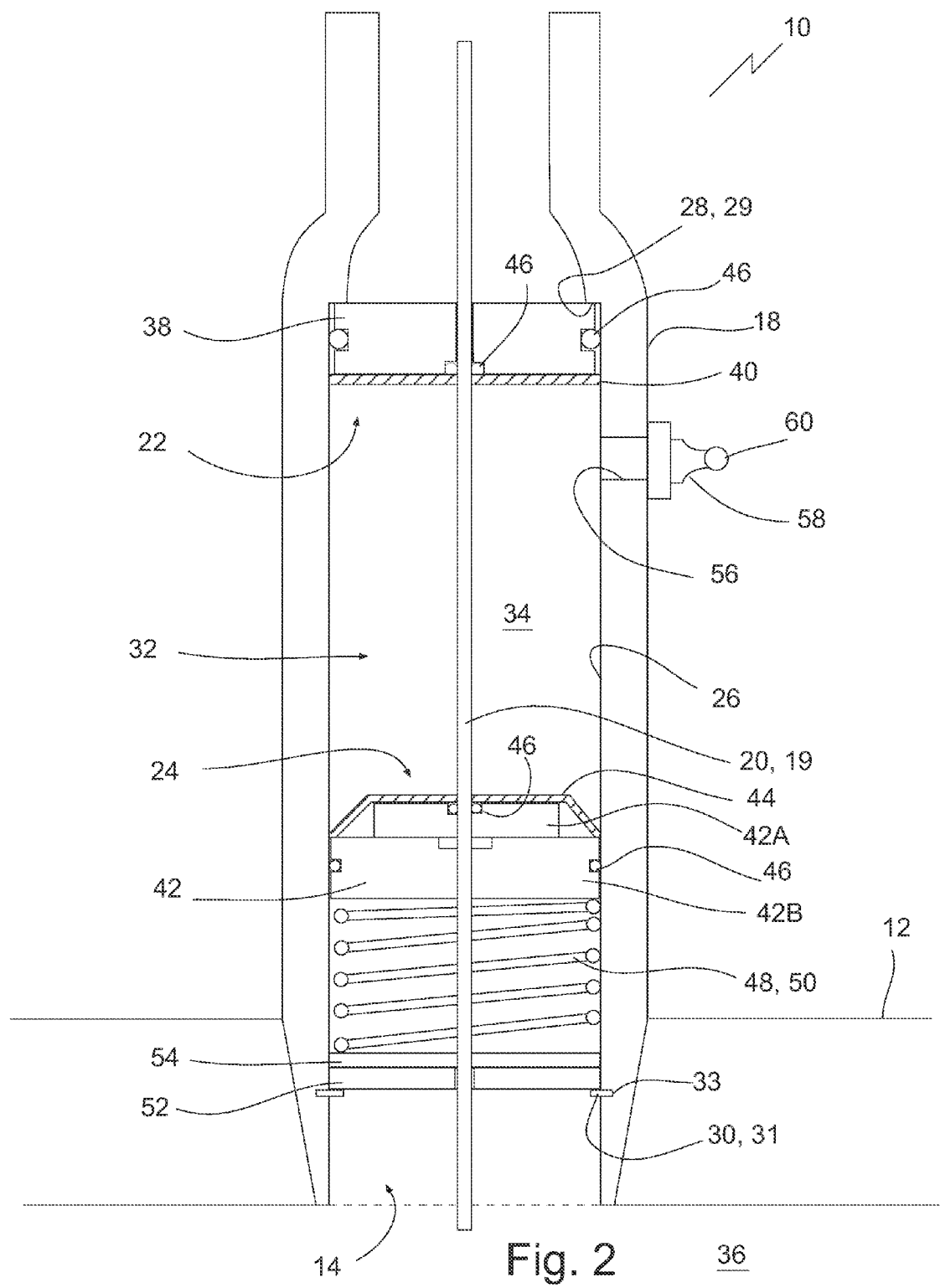
FIG. 2 is a side elevation section view of a sealing system used in the level monitor of FIG. 1.

Referring to FIGS. 1 and 2, a sealing system 10 for a tank 12 having a port 14 through the tank 12 is illustrated. As will be discussed below, the sealing system 10 may form part of a level monitor system. As shown in FIG. 2, the sealing system 10 comprises a housing 18, an elongate member 19 such as a cable 20, a first seal assembly 22 and a second seal assembly 24. Housing 18 defines a bore 26, which may be any suitable shape and may have a cylindrical cross-section as shown. The housing 18 also has exterior dimensions suitable for fitting of the housing 18, for example by threading (not shown), in the port 14 through the tank 12. As shown, the housing 18 may fit partially within the port 14, although the housing 18 may fit fully within the port 14 in some cases.

Referring to FIG. 2, the cable 20 passes through the bore 26 of the housing 18. As will be shown, the housing and the seal assemblies 22 and 24 collectively form a stuffing box that allows the cable 20 to move axially through the housing 18 while retaining a seal between the tank and the external environment. First seal assembly 22 is set within the bore 26 against a first stop 28 for example a shoulder 29 in the housing 18. The first seal assembly 22 is sealed to the housing 18 and to the cable 20 with the cable 20 passing through the first seal assembly 22. Similarly, second seal assembly 24 is set within the bore 26 against a second stop 30 for example a ring insert 31 in the housing 18. The second seal assembly 24 is sealed to the housing 18 and to the cable 20 with the cable 20 passing through the second seal assembly 24. Stops 28 and 30 may each comprise shoulders such as shoulder 29 or inserts such as ring insert 31 fitted within a corresponding bore indent 33, although other types of stops may be used.

First seal assembly 22 may comprise a first piston 38, which may abut against the shoulder or first stop 28. First seal assembly 22 may also comprise a first washer 40 disposed between the first piston 38 and the fluid 34. Similarly, second seal assembly 24 may comprise a second piston 42 and a second washer 44 disposed between the second piston 42 and the fluid 34. Washers 40 and 44 may be resilient for sealing purposes. Each of pistons 38 and 42 may comprise one or more pistons, such as upper and lower pistons 42A and 42B collectively forming piston 42 as shown. Although it is not required, each of pistons 38 and 42 may seal to one or more of the cable 20 and the bore 26 for example using various o-ring seals 46. Other suitable seals such as lip seals or packing may be used. Bore 26 may be designed to allow pistons 38 and 42 to move axially throughout the reservoir, although in some embodiments pistons 38 and 42 are permanently fixed against movement. Dynamic seals may be used to reduce friction on axial cable movement.

The first seal assembly 22 is spaced from the second seal assembly 24 to form a reservoir 32 containing a fluid 34, such as grease. The fluid 34 in the reservoir 32 may comprise incompressible fluid. In use, the fluid 34 in the reservoir 32 is provided under pressure. The use of fluid 34 under pressure between seal assemblies 22 and 24 restricts the passage of liquids or gas from within tank 12 to outside the tank 12 through bore 26. This is because cable 20 is effectively enveloped in a fluid seal forming a positive pressure gradient with fluids inside the tank 12. Thus, even if the seal assembly provided between the reservoir 32 and the interior 36 of the tank 12 is imperfect, fluid flow into the bore 26 is restricted while the fluid 34 within the reservoir 32 is pressurized. The reference to pressure herein refers to the fact that fluid 34 is maintained in use at a higher pressure than fluid within interior 36 of tank 12. In some embodiments fluid 34 may be above atmospheric pressure.

In the embodiment shown in FIG. 2, bias may be used to maintain pressure on the fluid 34 within the bore 26. For example, one or both of the first seal assembly 22 and the second seal assembly 24 may be biased against the fluid 34 to maintain pressure on the fluid 34. Thus, reservoir 32 may effectively be variable in volume. In general, one or more bias device 48 such as a spring 50 may maintain pressure on the fluid 34. The bias device 48 may be associated with the housing 18. In an example, second piston 42 is biased against the fluid by spring 50 disposed between the second piston 42 and the second stop 30. Other components may be present, such as spacers in the form of a snap ring 52 and a washer 54 between ring insert 31 and piston 42. The spring 50 may be a compression spring and may in some cases be adjustable in tension (not shown). Although the bias device 48 is illustrated as operating on one or both of pistons 42 and 38, the bias device 48 may be connected to bias against a third seal assembly (not shown) in fluid communication with reservoir 32. A fluid port 56 may be provided into the housing 18 for injection of the fluid 34, such as incompressible fluid, into the reservoir 32. A plug 58, which may contain a nipple 60, may be used to plug the reservoir 32 in use. The bias device 48 may be manually retracted during reservoir fluid 34 injection. A sight glass (not shown) or other suitable means for determining the level of fluid 34 in the sealing system 10 may be provided.

Referring to FIG. 1, as disclosed the sealing system 10 may be used in a level monitor system 100 for a tank 12, which is illustrated as an industrial petroleum storage cylinder with a fixed roof. A float 62 may be used for floating on liquid 64 in the tank. The cable 20 may be attached to the float 62 in use. A float guide 66 may be provided for guiding travel of the float 62 within the tank 12. An exemplary float guide 66 comprises one or more guide lines 68 extended a sufficient distance within tank 12, such as from the base 70 of the tank interior 36 to the tank roof 72. Float 62 may be connected to guide lines 68 in a suitable fashion such as by passing guide lines 68 through passages 74 in float 62. Guide lines 68 may attach to tank 12 by one or more anchor plates 76, or by one or more inserts 78 installed within ports 80 within the tank roof 72. Other suitable float guides 66 may be used, such as an internal track system. Although the float guide is illustrated as oriented for vertical travel, this is not required. The float 62 may be adapted to sit at the surface of a fluid of a particular density, although in some cases the float 62 may be adapted to sit at a fluid interface between two liquids such as oil and water. The sealing system 10 may be used with more than one cable 20 in some embodiments, for example if two floats are used, one for water and one for oil.

A scale 82 may be associated with the cable 20 or elongate member 19 for monitoring the position of the float 62 in the tank 12 in use. For example, a scale 82 is positioned along the sidewall 84 of tank 12, and an external end 86 of cable 20 is connected to an indicator such as a weighted bar 88. In order to balance the weight of bar 88 and ensure that the float 62 and bar 88 move as desired when the liquid level goes up or down, both the bar 88 and float 62 may be weighted. The scale 82 may be designed to be as large as possible for remote visual observation, for example by providing scale 82 large and distinct enough to substantially cover the entire vertical length of sidewall 84. A bar guide 90 may be provided to guide travel of the bar 88 along the sidewall 84 in a fashion similar to the float guide 66. Thus, guide lines 92 may extend lengthwise across the scale 82 and through holes 94 in bar 88. Other bar guides 90 may be used. Scale 82 may comprise a board 81 displaying a plurality of markers 83 corresponding to different levels of liquid 64 in tank 12. Scale 82 may be provided in other suitable forms, such as in the form of a clock or a plurality of markings or gradations along the length of the elongate member 19, for example if the elongate member 19 comprises a rigid rod. Scale 82 may be part of a gauge system and may comprise one or more sensors (not shown) for detecting the extension or retraction of the elongate member 19 in order to display the liquid level in discernable units. Although the bar guide 90 is oriented for vertical travel, this is not required, and even horizontal travel may be used. The scale 82 may be positioned outside tank 12, inside tank 12, or both outside and inside depending on the design.

Referring to FIGS. 1 and 3, one or more pulleys 96 (FIG. 1 only), 97, and 98 (FIG. 3 only) may be used to redirect the portion of the cable 20 outside of the tank 12 in use. A frame such as a covered frame 99 may be used for mounting one or more of the pulleys, in this case pulleys 97 and 98. The use of a covered frame 99 reduces ice build up that may affect performance of the system. The covered frame 99 may extend from the housing 18, forming a gauge head 101. Close tolerance between pulleys 97, 98 and the gauge 101 may reduce cable jumping. Although pulleys are illustrated as being used, other bearing surfaces including fixed surfaces (not shown) may be used to redirect cable 20. As shown in FIG. 3, various mounting points 102, 104, 106, and 108 may be provided to allow customization of the gauge head 101 for the particular tank application. Pulleys may be mounted on suitable axles, such as clevis pin axles (not shown). Clevis pins allow easy removal for simple and efficient cable assembly. Various other holes, such as holes 110 and 112, may be formed in gauge head 101 for other purposes such as weight reduction. FIGS. 4-7 illustrate various views of an exemplary gauge head 101.

Referring to FIGS. 8A-C, another embodiment of a sealing system 10, incorporated as part of gauge head 101, is illustrated. FIG. 8A illustrates the components of the sealing system 10 and gauge head 101 in an exploded view, while FIG. 8C illustrates these components as assembled together. As in the other embodiments, sealing system 10 comprises housing 18, first and second seal assemblies 22 and 24, respectively, port 14, first and second stops 28, and 30, respectively, retainer ring insert 31, plug 58, and spring 50. First seal assembly 22 comprises a sloped plate 114 and a gasket 116, while second seal assembly 24 comprises a spring plate 118 and a gasket 120. Spring 50 is supported by a vented plate 122 and retainer ring insert 31. It is understood that cable 20 (not shown) passes through the sealing system 10 in use and before reservoir 32 is filled. Sealing system 10 may comprise a spacer 124 within reservoir 32 to prevent the reservoir 32 from collapsing entirely when reservoir 32 runs out of fluid, and also to ensure that port 14 always remains in communication with reservoir 32 during use and prior to filling with fluid. Plug 58 may be a suitable zerk 126. Regarding the gauge head 101, pulleys 97 and 98 may be installed within frame 99 using clevis pins 128 and hitch pins 130. FIG. 8B illustrates the pins 128 and 130 in the assembled position.

Although the embodiments are described herein with reference to elongate member 19 comprising a cable 20, it should be understood that other suitable types of elongate members 19 may be used, such as rods, tape, and pipes. There is no requirement that elongate member 19 be circular in cross-section. Elongate member 19 may be rigid, flexible, or resilient.

The embodiments disclosed herein may be used on suitable tanks, which include storage tanks, reservoirs, vessels, pipelines, and other contained systems. Regarding storage tanks for a particular fluid, the type of tank used may be chosen according to the flash-point of that substance. Generally in refineries and especially for liquid fuels, there are fixed roof tanks and floating roof tanks, both of which may have the level monitor or sealing systems disclosed herein installed within. Fixed roof tanks are meant for liquids with very high flash points, (e.g. fuel oil, water, bitumen etc.) Cone roofs, dome roofs and umbrella roofs are usual. These are insulated to prevent the clogging of certain materials, wherein the heat is provided by steam coils within the tanks. Dome roof tanks are meant for tanks having slightly higher storage pressure than that of atmosphere (e.g. slop oil). Floating roof tanks may be broadly divided into external floating roof tanks, usually called floating roof tanks (FR Tanks) and internal floating roof types (IFR Tanks). IFR tanks may be used for liquids with low flash-points (e.g. ATF, MS. gasoline, ethanol). These tanks may be nothing but cone roof tanks with a floating roof inside that travels up and down along with the liquid level. This floating roof traps the vapor from low flash-point fuels. Floating roofs are supported with legs on which they rest. FR tanks do not have a fixed roof but a floating platform or roof only. Medium flash point liquids such as naphtha, kerosene, diesel, crude oil etc. may be stored in these tanks.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A sealing system for a tank having a port through the tank, the sealing system comprising:
   a housing defining a bore, the housing having exterior dimensions suitable for fitting of the housing in the port through the tank;
   a cable passing through the bore of the housing;
   a first seal assembly set within the bore against a first stop in the housing, the first seal assembly being sealed to the housing and to the cable with the cable passing through the first seal assembly by passing into a first end of the first seal assembly and out a second end of the first seal assembly, the first seal assembly forming a dynamic seal with the cable to permit the cable to axially move relative to the first seal assembly;
   a second seal assembly set within the bore against a second stop in the housing, the second sealing assembly being sealed to the housing and to the cable with the cable passing through the second seal assembly by passing into a first end of the second seal assembly and out a second end of the second seal assembly, the second seal assembly forming a dynamic seal with the cable to permit the cable to axially move relative to the second seal assembly; and
   the first seal assembly being spaced from the second seal assembly to form a reservoir containing a fluid and one or both of the first seal assembly and the second seal assembly being biased against the fluid to maintain pressure on the fluid.

2. The sealing system of claim 1 in which the first stop comprises a shoulder, the first seal assembly comprises a first piston, and the first piston abuts against the shoulder.

3. The sealing system of claim 2 in which the first seal assembly comprises a first washer disposed between the first piston and the fluid.

4. The sealing system of claim 1 in which the second seal assembly comprises a second piston biased against the fluid by a spring disposed between the second piston and the second stop.

5. The sealing system of claim 4 in which the second seal assembly comprises a second washer disposed between the second piston and the fluid.

6. The sealing system of claim 1 in which the fluid in the reservoir comprises incompressible fluid.

7. The sealing system of claim 1 further comprising a float for liquid in the tank, in which the cable is attached to the float in use.

8. The sealing system of claim 7 further comprising a scale associated with the cable for monitoring the position of the float in the tank in use.

9. The sealing system of claim 7 further comprising one or more pulleys for redirecting the portion of the cable outside of the tank in use.

10. The sealing system of claim 9 further comprising a covered frame for mounting the one or more pulleys.

11. The sealing system of claim 10 in which the covered frame extends from the housing.

12. The sealing system of claim 7 further comprising a float guide for guiding travel of the float within the tank.

13. The sealing system of claim 1 further comprising a fluid port in the housing for injection of the fluid into the reservoir.

14. The sealing system of claim 1 in which the fluid in the reservoir comprises grease.

15. A kit comprising the components of the sealing system of claim 1.

16. A level monitor for a tank containing liquid and having a port through the tank, the level monitor comprising:
- a float for the liquid in the tank;
- a housing defining a bore, the housing having exterior dimensions suitable for fitting of the housing in the port through the tank;
- an elongate member attached to the float and passing through the bore of the housing;
- a first seal assembly set within the bore against a first stop in the housing, the first seal assembly being sealed to the housing and to the elongate member with the elongate member passing through the first seal assembly by passing into a first end of the first seal assembly and out a second end of the first seal assembly, the first seal assembly forming a dynamic seal with the elongate member to permit the elongate member to axially move relative to the first seal assembly;
- a second seal assembly set within the bore against a second stop in the housing, the second sealing assembly being sealed to the housing and to the elongate member with the elongate member passing through the second seal assembly by passing into a first end of the second seal assembly and out a second end of the second seal assembly, the second seal assembly forming a dynamic seal with the elongate member to permit the elongate member to axially move relative to the second seal assembly; and
- the first seal assembly being spaced from the second seal assembly to form a reservoir containing a fluid under pressure.

17. The level monitor of claim 16 in which the elongate member comprises a cable.

18. The level monitor of claim 17 further comprising a scale associated with the cable for monitoring the liquid level.

19. A sealing system for a tank having a port through the tank, the sealing system comprising:
- a housing defining a bore, the housing having exterior dimensions suitable for fitting of the housing in the port through the tank;
- an elongate member passing through the bore of the housing;
- a first seal assembly set within the bore against a first stop in the housing, the first seal assembly being sealed to the housing and to the elongate member with the elongate member passing through the first seal assembly by passing into a first end of the first seal assembly and out a second end of the first seal assembly, the first seal assembly forming a dynamic seal with the elongate member to permit the elongate member to axially move relative to the first seal assembly;
- a second seal assembly set within the bore against a second stop in the housing, the second sealing assembly being sealed to the housing and to the elongate member with the elongate member passing through the second seal assembly by passing into a first end of the second seal assembly and out a second end of the second seal assembly, the second seal assembly forming a dynamic seal with the elongate member to permit the elongate member to axially move relative to the second seal assembly;
- the first seal assembly being spaced from the second seal assembly to form a reservoir containing a fluid; and
- a bias device for maintaining pressure on the fluid.

20. The level monitor of claim 19 in which the bias device comprises a spring and the second seal assembly comprises a piston biased against the fluid by the spring, the bias device being disposed between the piston and the second stop in the housing.

* * * * *